US008794567B2

(12) United States Patent
Adir

(10) Patent No.: US 8,794,567 B2
(45) Date of Patent: Aug. 5, 2014

(54) CONTROL AND SAFETY SYSTEM FOR AN AIRPLANE

(76) Inventor: Yigal Adir, Los Angeles, CA (US)

(*) Notice: Subject to any disclaimer, the term of this patent is extended or adjusted under 35 U.S.C. 154(b) by 1190 days.

(21) Appl. No.: 11/582,046

(22) Filed: May 8, 2007

(65) Prior Publication Data

US 2010/0127115 A1    May 27, 2010

(51) Int. Cl.
    *B64C 15/00*     (2006.01)
    *B64B 1/36*     (2006.01)

(52) U.S. Cl.
    USPC ............................................... 244/52

(58) Field of Classification Search
    USPC ............ 244/7 A, 7 R, 52, 139, 56, 53 B, 140, 244/53 R; 60/39.25, 226.1, 229
    See application file for complete search history.

(56) References Cited

U.S. PATENT DOCUMENTS

| 3,068,647 | A | * | 12/1962 | Santamaria et al. | 60/39.25 |
|---|---|---|---|---|---|
| 3,107,887 | A | * | 10/1963 | Dixon et al. | 244/139 |
| 3,289,980 | A | * | 12/1966 | Hill | 244/56 |
| 3,298,637 | A | * | 1/1967 | Lee | 244/53 B |
| 3,318,095 | A | * | 5/1967 | Snell | 60/226.1 |
| 3,833,192 | A | * | 9/1974 | Vitack et al. | 244/139 |
| 4,298,177 | A | * | 11/1981 | Berlongieri | 244/139 |
| 4,699,336 | A | * | 10/1987 | Diamond | 244/140 |
| 5,297,388 | A | * | 3/1994 | Nightingale | 60/229 |
| 5,899,414 | A | * | 5/1999 | Duffoo | 244/139 |
| 5,996,935 | A | * | 12/1999 | Snell | 244/53 R |
| 6,918,244 | B2 | * | 7/2005 | Dickau | 60/229 |
| 7,523,891 | B2 | * | 4/2009 | Hakki et al. | 244/152 |
| 2003/0127565 | A1 | * | 7/2003 | Haffen et al. | 244/139 |
| 2011/0315827 | A1 | * | 12/2011 | Collins et al. | 244/7 A |
| 2013/0026302 | A1 | * | 1/2013 | Lee et al. | 244/7 R |

\* cited by examiner

*Primary Examiner* — Valentina Xavier

(74) *Attorney, Agent, or Firm* — Cislo & Thomas LLP

(57) ABSTRACT

A Safety and Control System for an airplane that allows a pilot to adjust the direction of an airplane and protect the plane in emergency situations. The engine of the plane can create thrust in more than one direction for improved maneuverability. A plurality of parachutes and landing pads can be deployed to protect the plane, along with the people in it.

14 Claims, 6 Drawing Sheets

CONTROL AND SAFETY SYSTEM FOR AN AIRPLANE

TECHNICAL FIELD

This invention relates to features on an airplane that assist in safety and control.

BACKGROUND

Current airplanes use jets that only provide thrust in one direction. An increase in the number of directions of thrust could allow jets to increase maneuverability in the air. In addition, aircrafts lack sufficient safety systems for dealing with engine failures. For the foregoing reasons there is a need for increased maneuverability and safety in airplanes.

SUMMARY

The present invention is directed to a control and safety system that increases the maneuverability and safety of airplanes. As shown in FIG. 1, the system comprises adjustable jet engine exhaust directions, a series of parachutes, and landing pads for an airplane.

The object of this invention is to give an aircraft increased maneuverability, while giving an aircraft a way to land safely in the case of an emergency. The increased maneuverability can assist a plane in avoiding accidents, in fighting other planes, or for more control in take-off and landing. The parachutes and landing pads can save a plane and the people inside it from destruction even if the engines fail.

DETAILED DESCRIPTION OF THE INVENTION

Figure 1:
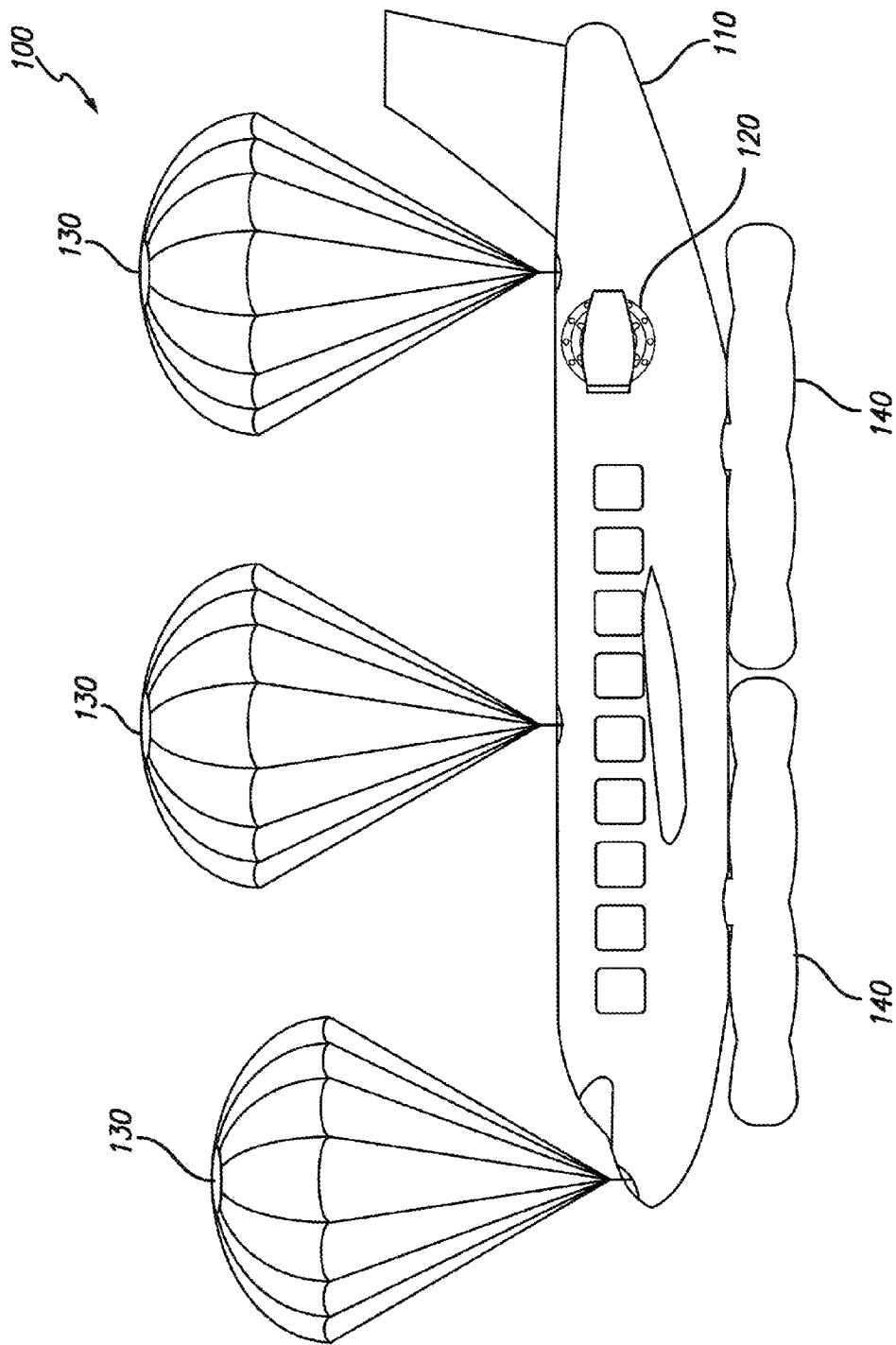
FIG. 1 shows an airplane with the control and safety systems deployed.

As shown in FIG. 1, the control and safety system 100 comprising a power jet controller 120, a plurality of parachutes 130, and inflatable landing pads 140 can be used to increase the control and safety of an airplane 110.

A power jet controller is a new device that will allow a jet airplane to maneuver quickly in different directions that other airplanes cannot. The embodiments noted here are the switch-engine type power jet controller 120 and the ball-type power jet controller 400.

Figure 2:
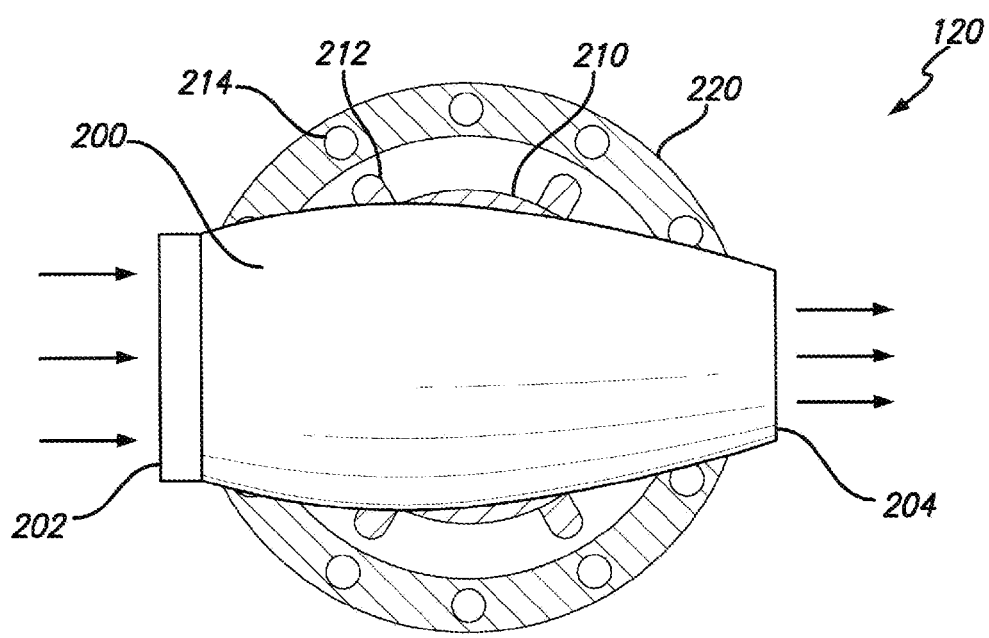
FIG. 2 shows a power jet controller with a rotating jet engine providing forward thrust.
Figure 3:
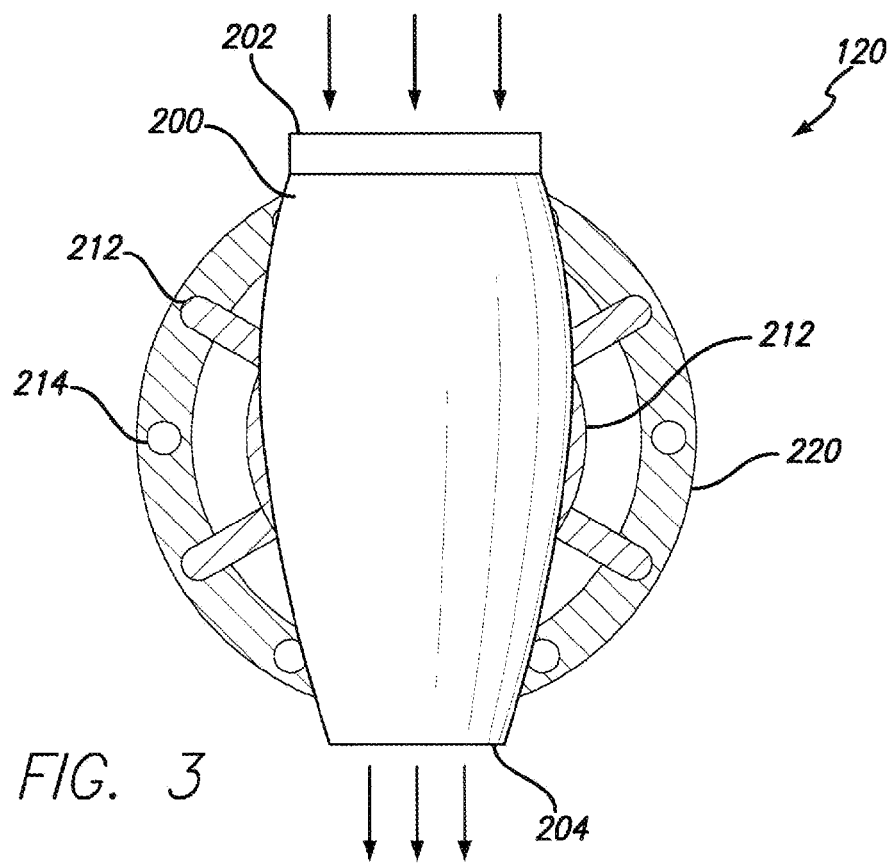
FIG. 3 shows a power jet controller with a rotating jet engine providing upward thrust.

As shown in FIGS. 2 and 3, the switch-engine type power jet controller 120 is a device that rotates a mounted jet engine 200 of an airplane with up to a full 360° of motion. FIG. 2 shows the intake 202 taking air into the engine 200 and expelling the air out at the exhaust 204 towards the right, causing a thrust to the left. FIG. 3 shows the engine rotated so the air is expelled downwards, causing thrust upwards. The angle of orientation would be controlled by the pilot in a cockpit using a control panel. Once the desired angle is reached, the jet engine orientation would be locked in. In one embodiment, the jet engine is attached to a rotatable metal ring 210 with retractable pins 212. The pins 212 can extend into holes 214 of a fixed metal ring 220 on the airplane 110 to lock the jet engine 200 in place as shown in FIG. 3. A pilot in a cockpit could control the power jet controller 120 with a control pad. In some embodiments, the jet engine 200 may use a hydraulic pump or an electric pump with motors and hydraulic arms for rotation. When mounted on the side of an airplane, this would allow a plane to fly up, down, backwards and forwards. This would assist in landing, takeoff, and maneuvering in the air. This would also help avoid accidents or give a combat jet fighter an advantage. The size and range of motion of the power jet controller 120 would depend on the size of the plane 110 and engine 200. Other methods of rotating the engine 200 may also be implemented.

Figure 4:
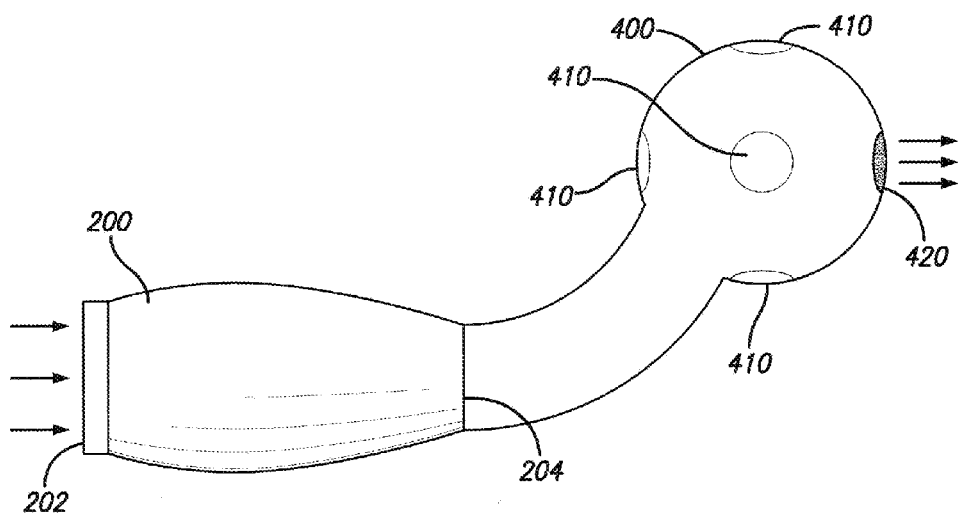
FIG. 4 shows a power jet controller with an exhaust reservoir with the back hole open.
Figure 5:
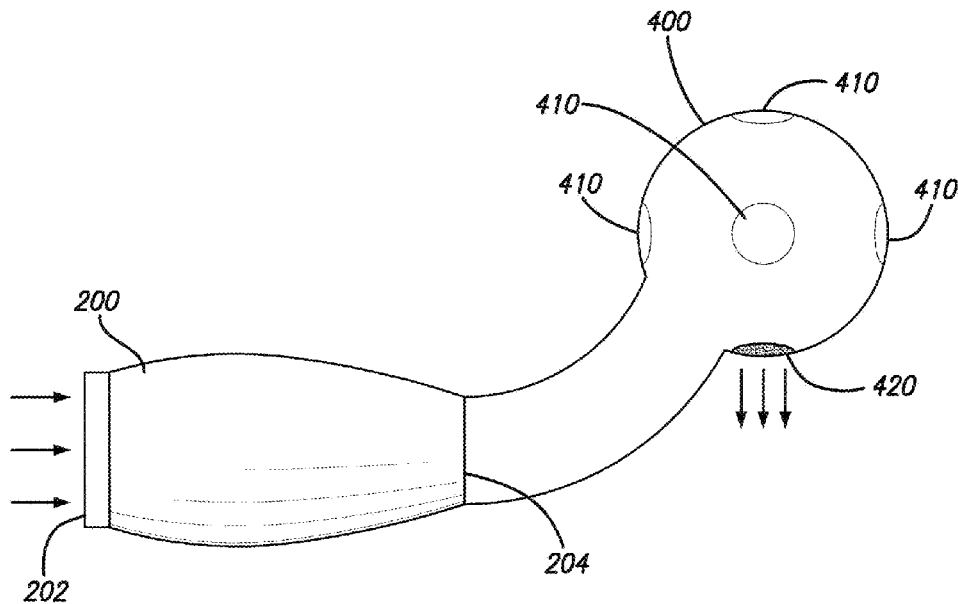
FIG. 5 shows a power jet controller with an exhaust reservoir with the bottom hole open.

As shown in FIGS. 4 and 5, the ball-type power jet controller 400 connects an exhaust reservoir to the exhaust 204 of the engine 200 of a jet airplane 110. The exhaust reservoir is ball-shaped and has holes that can be covered 410 or uncovered 420. Although this embodiment uses a ball shape, other shapes are also viable. A control panel in the cockpit can be utilized by a pilot to control which of those holes are open at any given time. In one embodiment, the control panel could be analog control switches that activate a motor to move coverings of the exhaust reservoir by use of mechanical arms.

The jet exhaust stream will exit the exhaust reservoir from whichever hole is open. This will provide thrust to the airplane in the opposite direction. For example, in a ball-type power jet controller with six holes corresponding to the top, bottom, front, back, left, and right, if a cockpit chose to keep the top hole open, the jet engine exhaust would exit the exhaust reservoir from the top, giving the airplane thrust downwards. If the cockpit altered the coverings to make the hole on the left open, the airplane would have thrust to the right. This gives the pilot increased control over the airplane to avoid accidents in the air. In a combat jet fighter, this would give an important advantage of maneuverability to the plane. In one embodiment, the device would be placed directly behind and four feet above a cockpit. A reflector between the cockpit and the power jet controller would protect the pilot from heat. The device would be connected to the jet engine 200 by the use of exhaust lines.

Figure 6:
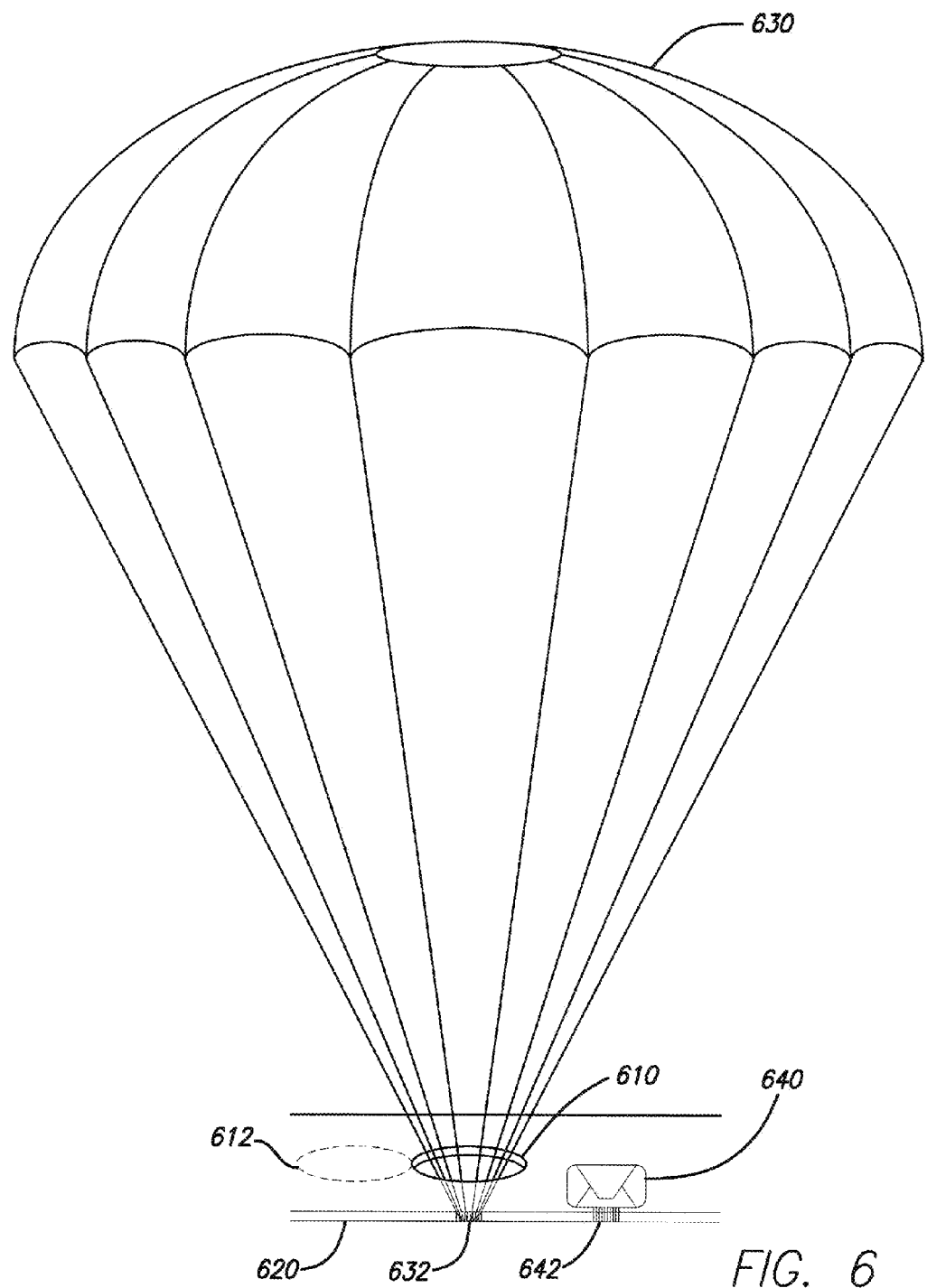
FIG. 6 shows a deployed main parachute and a deflated backup parachute.
Figure 7:
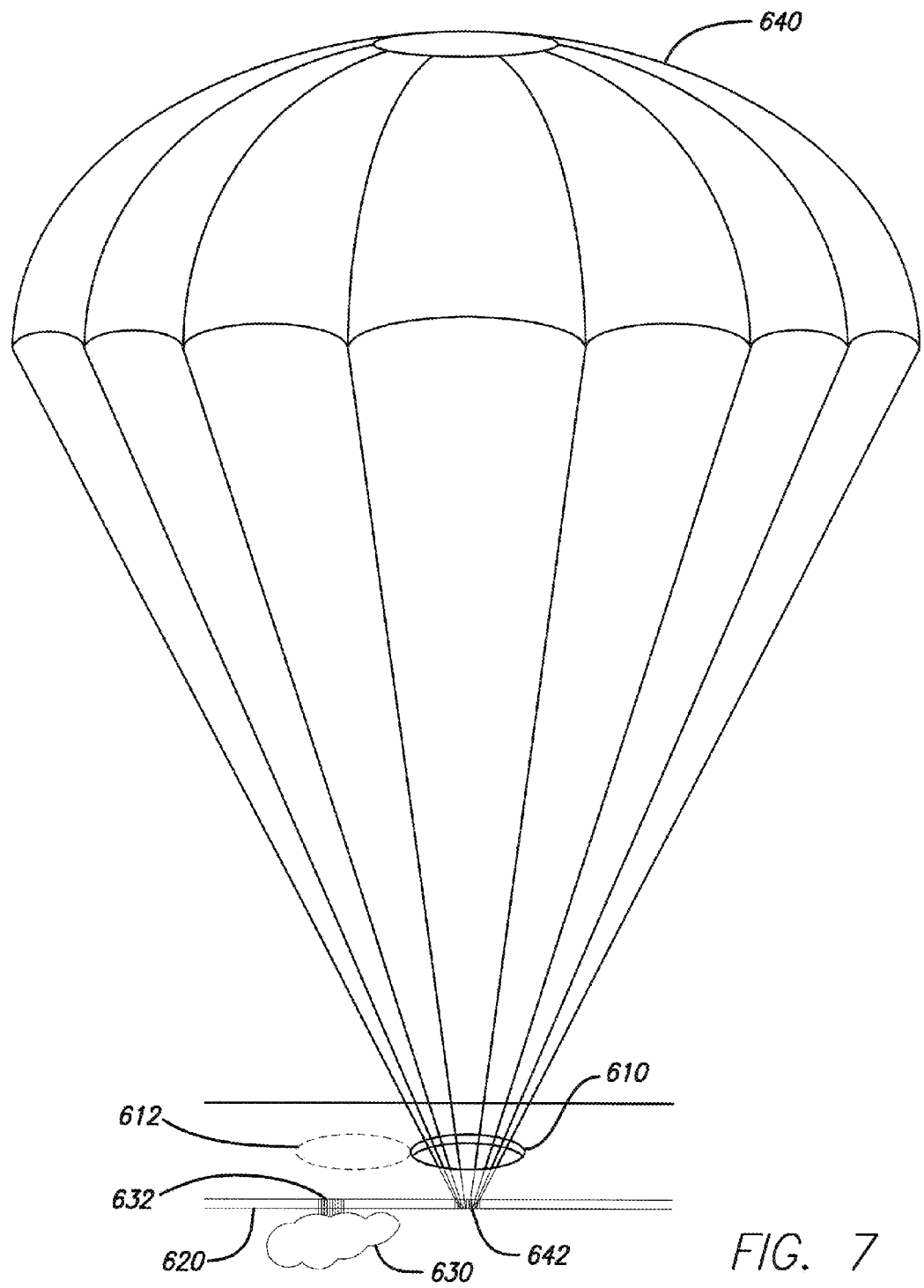
FIG. 7 shows a failed main parachute and an inflated backup parachute.

As shown in FIGS. 1, 6, and 7, the plurality of parachutes 130 for the safety system would further increase the safety of the airplane 110. In case of engine failure, this system could save the passengers, crew, and airplane 110. A pilot would be able to activate the plurality of parachutes 130 from the cockpit by way of an analog control device. This would remove coverings 612 to provide an opening 610 in different sections of the airplane by use of an electric or hydraulic motor. A primary parachute 630 with an attachment point 632 on a parachute attachment line 620 would then be released out of the opening 610 as in FIG. 6. In case of failure of a primary parachute 630, a reserve parachute 640 with a reserve attachment point 642 on the parachute attachment line 620 could slide into place and activate as in FIG. 7. The number, size, and shape of the parachutes will depend on the kind of airplane 110.

Figure 8:
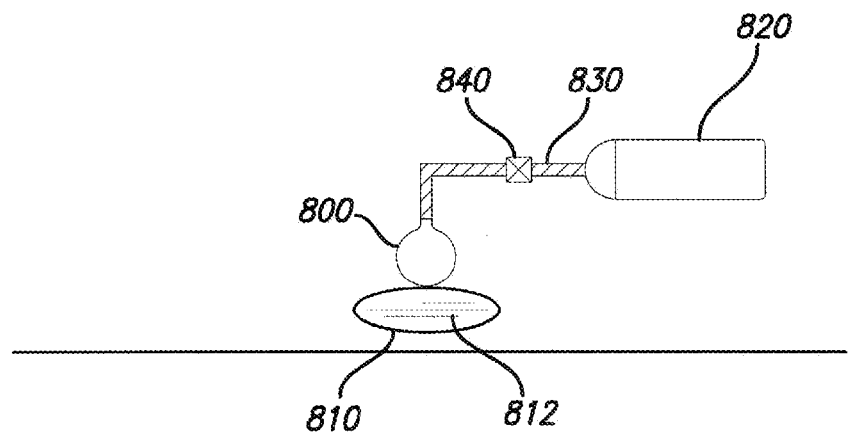
FIG. 8 shows a landing pad in its deflated state.
Figure 9:
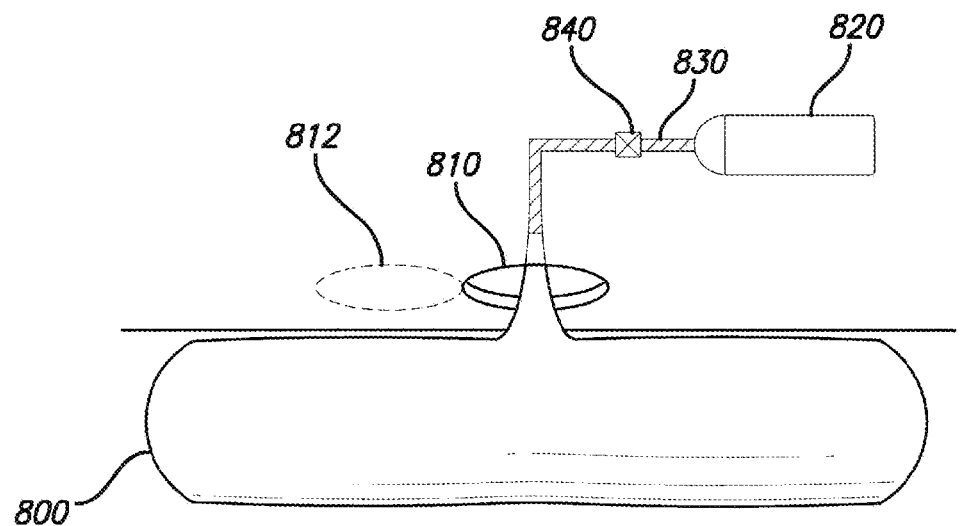
FIG. 9 shows a landing pad in its inflated state.

As shown in FIGS. 8 and 9, the inflatable landing pad 800 can be activated in an emergency situation. The landing pad 800 will be made of a strong, flexible material like rubber to cushion the bottom of a plane for a softer and safer landing. A pilot activating an analog control system will cause a sliding door 812 on the bottom of the airplane to move, providing an opening 810 while also opening a pressure valve 840 of gas 820 that has a connection 830 to the landing pad 800 and inflates the landing pad 800. The sliding door 812 can be controlled by use of an electric and/or hydraulic engine. The control and safety system 100 can include a plurality of landing pads 140. For example, an aircraft can have five landing pads for five different areas of the plane. An example of a gas 820 that can be used to inflate the landing pad 800 is $CO_2$. The number, size, and shape of the lands pads 140 will depend on the kind of airplane 110.

I claim:

1. A control system for an airplane having a control device to change a direction of a jet engine on the airplane, wherein the control device comprises:
    a metal frame attached to the airplane;
    a rotatable metal wheel, wherein the rotatable metal wheel can rotate in a circle; and
    a locking mechanism attached to the metal wheel that locks the metal wheel to the metal frame;
    wherein the metal wheel is attached to the jet engine so that the jet engine rotates with the metal wheel.

2. The control system of claim 1, wherein the control device is made of a material with a melting point that can handle a pressure and a heat of a jet stream outlet.

3. The control system of claim 1, further comprising controls in a cockpit that controls the locking mechanism and a rotation of the rotatable metal wheel.

4. The control system of claim 1, further comprising a safety system for the airplane, wherein the safety system comprises:
    a plurality of parachutes, wherein at least one parachute opens in case of an emergency; and
    controls in a cockpit to activate the at least one parachute.

5. The control system of claim 1, further comprising an exhaust device to control a direction of jet engine exhaust, wherein the exhaust device comprises:
    an exhaust reservoir;
    an intake opening in the exhaust reservoir to receive the jet engine exhaust;
    at least two exhaust openings in the exhaust reservoir; and
    a means for blocking exhaust openings to direct the jet engine exhaust.

6. The control system of claim 5, wherein the exhaust device is made of a material with a melting point that can handle a pressure and a heat of the jet engine exhaust.

7. The control system of claim 5, further comprising controls in a cockpit that control the means for blocking the exhaust openings.

8. The control system of claim 4, wherein the controls further activate at least one sliding door to provide an opening for the at least one parachute.

9. The control system of claim 4, further comprising at least one backup parachute that deploys if the at least one parachute fails.

10. The control system of claim 4, wherein the plurality of parachutes comprises a first parachute and a second parachute, wherein the first parachute differs in size and shape from the second parachute.

11. The control system of claim 1, further comprising a safety system for the airplane, wherein the safety system comprises:
    at least one inflatable landing pad for the airplane;
    wherein the landing pad is stored deflated inside the airplane; and
    wherein the landing pad is activated to inflate the landing pad and cover at least a portion of a bottom of the airplane to cushion the airplane.

12. The control system of claim 11, further comprising controls in a cockpit to activate the at least one landing pad.

13. The control system of claim 11, wherein the landing pad comprises strong, flexible material.

14. The control system of claim 12, wherein the controls control at least one valve to release pressured gas to the landing pad.

* * * * *